United States Patent [19]
Bassignani

[11] 3,907,166
[45] Sept. 23, 1975

[54] MATERIAL MEASURING AND DISPENSING DEVICE

[76] Inventor: Anthony L. Bassignani, 17 King St., Norfolk, Mass. 02056

[22] Filed: May 3, 1974

[21] Appl. No.: 466,732

[52] U.S. Cl. .................. 222/42; 222/284; 222/428
[51] Int. Cl.² .................. B67D 5/22; G01F 11/18
[58] Field of Search .......... 222/284, 452, 436, 426, 222/427, 428, 429, 430, 434, 42, 309, 222/361; 221/94

[56] References Cited
UNITED STATES PATENTS

| | | | |
|---|---|---|---|
| 928,052 | 7/1909 | Hirsch | 222/452 |
| 2,002,039 | 5/1935 | McPhee | 222/284 X |
| 2,781,155 | 2/1957 | Katz | 222/284 |
| 2,983,408 | 5/1961 | Schwartz | 222/284 |
| 3,261,503 | 7/1966 | Cassidy | 222/284 X |
| 3,305,139 | 2/1967 | Ward | 222/284 X |

*Primary Examiner*—Robert B. Reeves
*Assistant Examiner*—Hadd Lane
*Attorney, Agent, or Firm*—Edgar H. Kent

[57] ABSTRACT

A measuring and dispensing device for granular material has a container for the material with an outlet at the bottom. A plurality of closely adjacent dispensing compartments, a barrier member and a closure member are relatively reciprocable beneath the container between a fill position in which all of the compartments have their tops exposed to the outlet and their bottoms closed by the closure member, and dispense positions in which selected numbers of the compartments have their tops shielded from the outlet by the barrier member and their bottoms exposed for dispensing. Control means is provided to stop the relative movement of compartments and members at selected dispense positions corresponding to the selected numbers, and adjustment means is operable to set the control means and indicate the quantity that will be dispensed at each setting.

11 Claims, 9 Drawing Figures

US Patent  Sept. 23,1975  Sheet 4 of 5  3,907,166

MATERIAL MEASURING AND DISPENSING DEVICE

BACKGROUND OF THE INVENTION

1. Field of the Invention

This invention relates to devices for measuring and dispensing granular materials, particularly for domestic use.

2. Description of the Prior Art

Devices of the type concerned have been proposed in which a slide is provided with a measuring and dispensing chamber open at the top and bottom. At one position of the slide the open top of the chamber registers with an opening in a container of the material to be dispensed located above the slide, so that the chamber fills. At another position of the slide, it closes the opening in the material container and exposes the open bottom of the compartment to an outlet, so that the material therein is dispensed. Such devices are disclosed for example in U.S. Pat. Nos. 2,041,887 and 2,561,696.

Devices as just described are subject to certain infirmities which have inhibited practical use thereof. The measuring and dispensing chamber should be of capacity equal to the smallest quantity the user is likely to want to dispense (e.g. one-fourth cup). This means that to dispense larger quantities the user must manipulate the slide between fill and dispense positions of the chamber a plurality of times (e.g. four times for one cup with a ¼ cup capacity chamber). This is not only a tedious procedure but also there is no way of determining except by guess when the chamber is full. The result may be dispensing less than full quantities from the chamber and consequently failure to obtain the full desired measured quantity, particularly if the user is impatient.

In an effort to overcome these difficulties it has been proposed to provide a sliding chamber of maximum capacity and to subdivide it by partitions into compartments of a desired minimum capacity. The user desiring to dispense less than the maximum capacity of the chamber partially manipulates the sliding chamber between fill and dispense positions so that only that number of compartments having the desired aggregate capacity are both filled and dispensed. Examples of such devices are disclosed in U.S. Pat. Nos. 2,767,889 and 3,007,612. These patents provide external dials movable with the slide from the position of which relative to a fixed indicator the user determines the number of compartments being dispensed at each operation. Such devices are difficult and tedious to operate with precision, and offer little advantage over a graduated transparent measuring cup.

SUMMARY OF THE INVENTION

An object of this invention is to provide, in a dispensing device of the general type discussed, dispensing control means which may be set to predetermine any number of compartments that will dispense on each ensuing dispensing actuation until it is reset. Another object is to provide such means which has adjustment means that is set against a dial indicating the quantity that will be dispensed by the number of compartments corresponding to each setting. A further object is to provide a dispensing device equipped with such means which is inexpensive to make, easy to use, and substantially leak and spill proof.

In attaining the foregoing objects, in preferred embodiments there is provided a container for the material to be dispensed which has a discharge outlet at the bottom. The dispensing means has a plurality of closely adjacent dispensing compartments open at top and bottom, a barrier member for shielding the tops of the compartments from the container outlet at one position relative to the compartments and a closure member for closing the bottoms of the compartments at one position relative to the compartments. The dispensing means is mounted beneath the container for relative reciprocation of the compartments and the members between a fill position in which all of the compartments have their tops exposed to the container outlet and their bottoms closed by the closure member, and dispense positions in which selected numbers of the compartments have their tops shielded from the outlet by the barrier member and their bottoms exposed for dispensing. Dispense operating means is accessible from the exterior of the device for relatively reciprocating the compartments and the members, and control means is adjustable to stop such relative reciprocation at selected dispense positions corresponding to the selected numbers. Adjustable means accessible from the exterior of the device sets the control means and includes indicator means showing the compartment capacity to be dispensed at each setting.

In one embodiment the members are fixed and the compartments are contained in a reciprocable slide. In another embodiment the compartments are fixedly mounted at the container outlet and the members are mounted for reciprocation with respect thereto.

Figure 1:
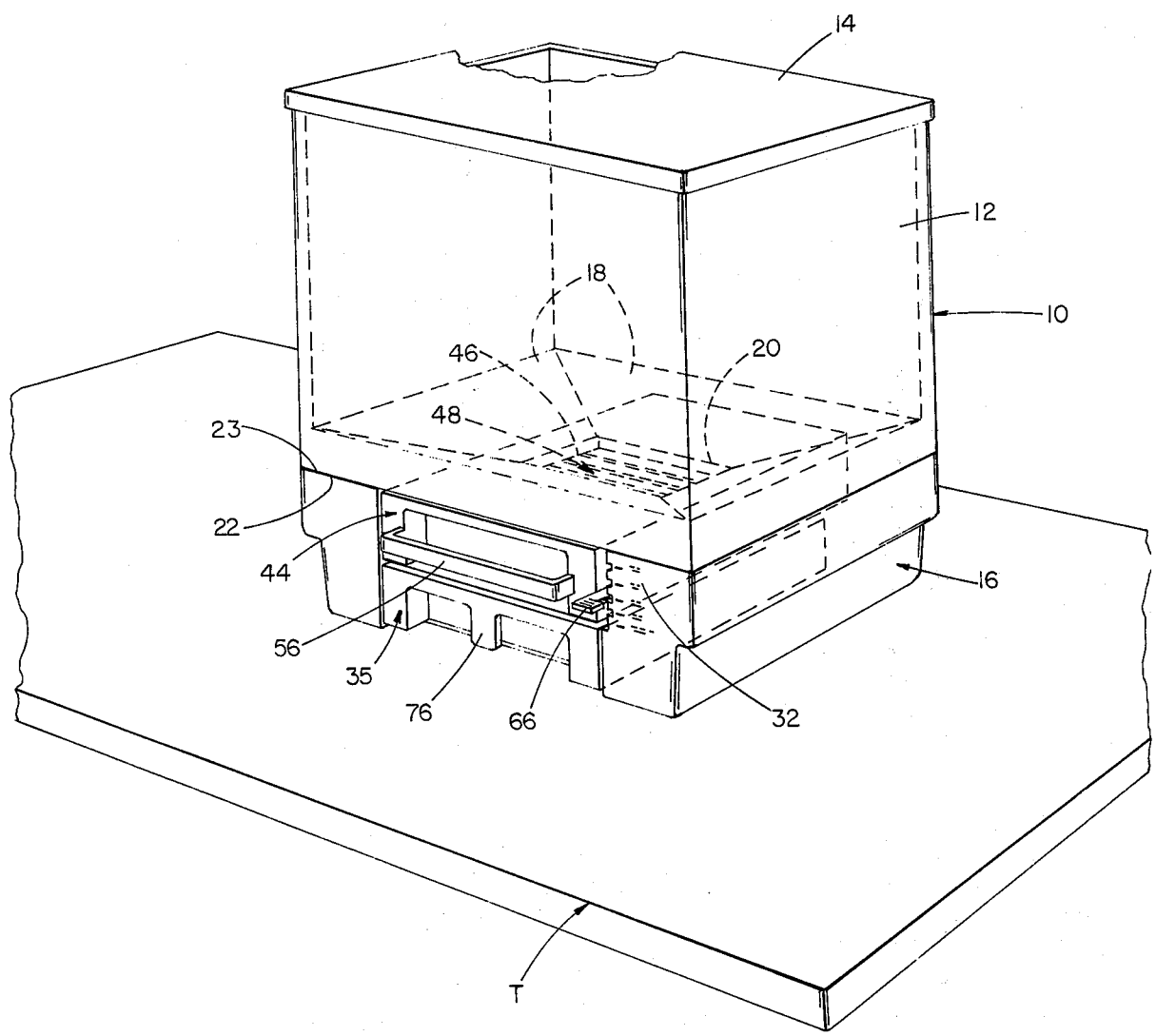
FIG. 1 is a front and side perspective view of a preferred embodiment, with internal structure indicated by dotted lines.
Figure 2:
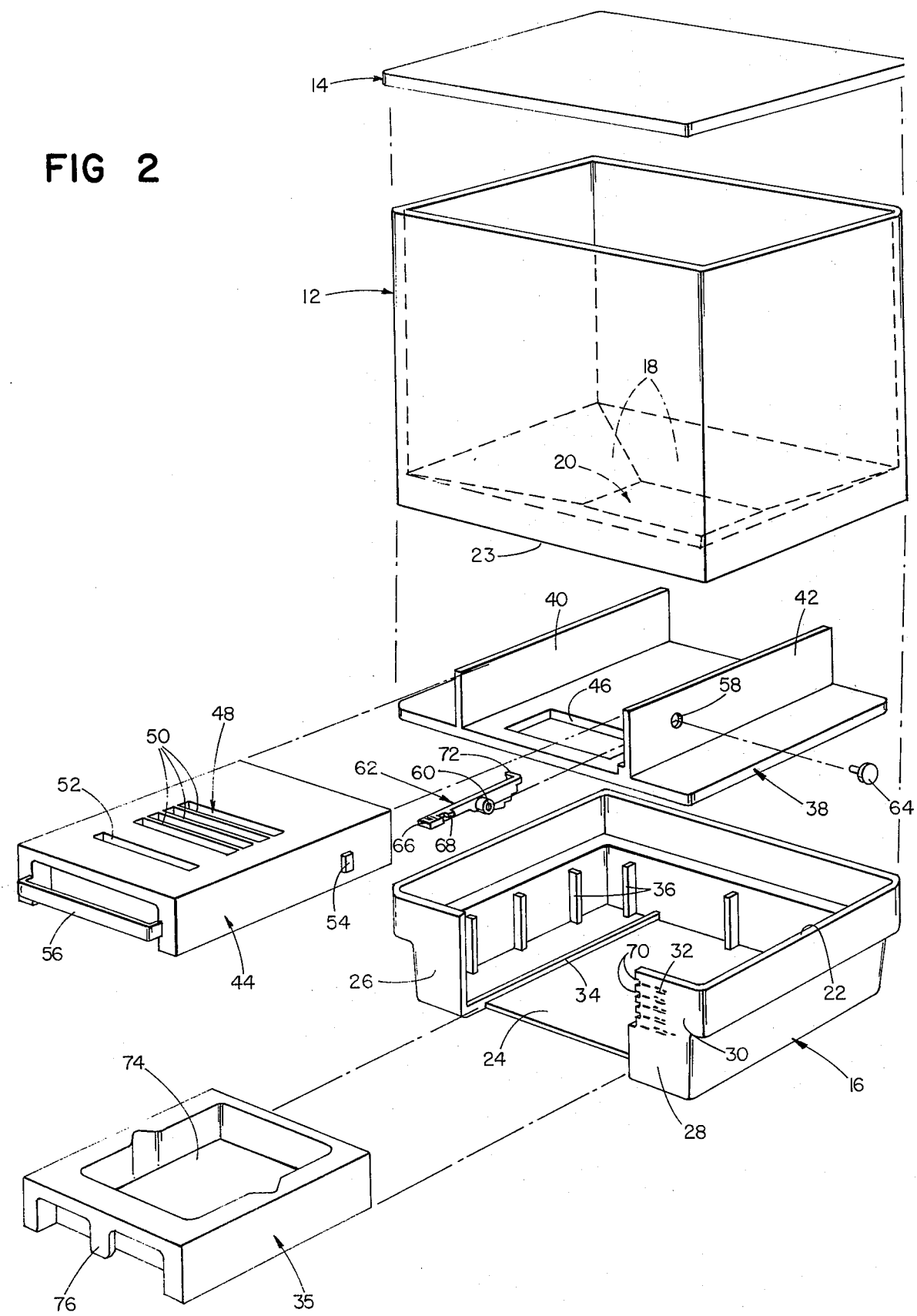
FIG. 2 is an exploded perspective view of the various parts of the device of FIG. 1.

Referring first to FIGS. 1 and 2 the device, designated generally 10, shown as generally rectangular in cross-section, has an upper container 12 for receiving the material to be dispensed having a removable cover 14, and a base 16 which contains the dispensing mechanisms, the control and the adjustment mechanisms and the receiving cup, as hereinafter described. Base 16 is designed to rest on a table or counter top T as shown, but may also be provided, e.g., on the rear wall of container 12, with means (not shown) for attachment to a room wall.

Container 12 is provided with bottom walls 18 which slant downwardly and inwardly from near the base of the outer walls to a discharge outlet 20 the vertical transverse center plane of which is located rearwardly of the vertical transverse center plane of the container. As shown and preferred, outlet 20 is of generally rectangular shape.

Base 16 has a top rim 22 the upper end of which forms a seat for the bottom edge 23 of the sidewalls of container 12 and to which the latter may be cemented or otherwise secured with outlet 20 lying substantially in the plane of edge 23. Below rim 22, the walls of base 16 extend somewhat inwardly and then downwardly to a flat bottom wall 24. The front portion of base 16 is open between short side walls 26 and 28, wall 28 having a top portion 30, not as wide as the remainder, which carries indicia 32 visible from the front.

Bottom wall 24 has a pair of ledges 34 (one shown in FIG. 2) in line with the side edges of wall portions 26 and 28, forming slide guides for dispenser receiving cup 35. On the inner sidewalls of base 16 are provided ribs 36 extending vertically from bottom 24. The upper ends of ribs 36 form a seat for a shelf 38 which may be secured thereto. Shelf 38 has a pair of upstanding walls 40, 42 extending upwardly therefrom and forming side guides for a slide 44 which in this embodiment contains the dispensing compartments. Shelf 38 is provided with an opening 46 having its vertical transverse center plane spaced forwardly of the vertical transverse center plane of the device so that it lies a predetermined distance forwardly of outlet 20 from container 12 when the shelf is positioned on ribs 36.

Figure 3:
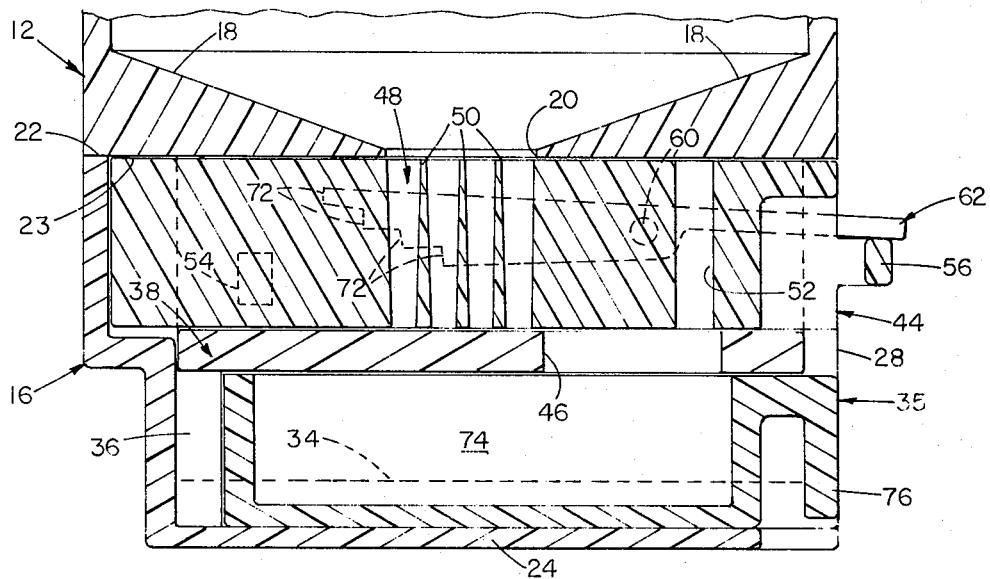
FIG. 3 is a fragmentary view of the device, partly in longitudinal section, partly in side elevation, showing the device in fill operation.
Figure 4:
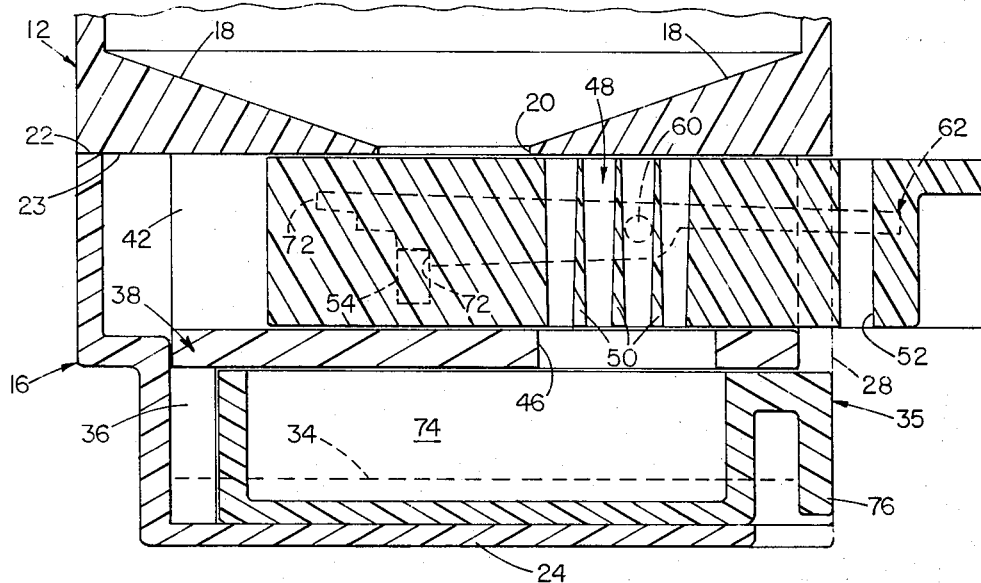
FIG. 4 is a view similar to FIG. 3 showing the device in a full dispense operation.
Figure 5:
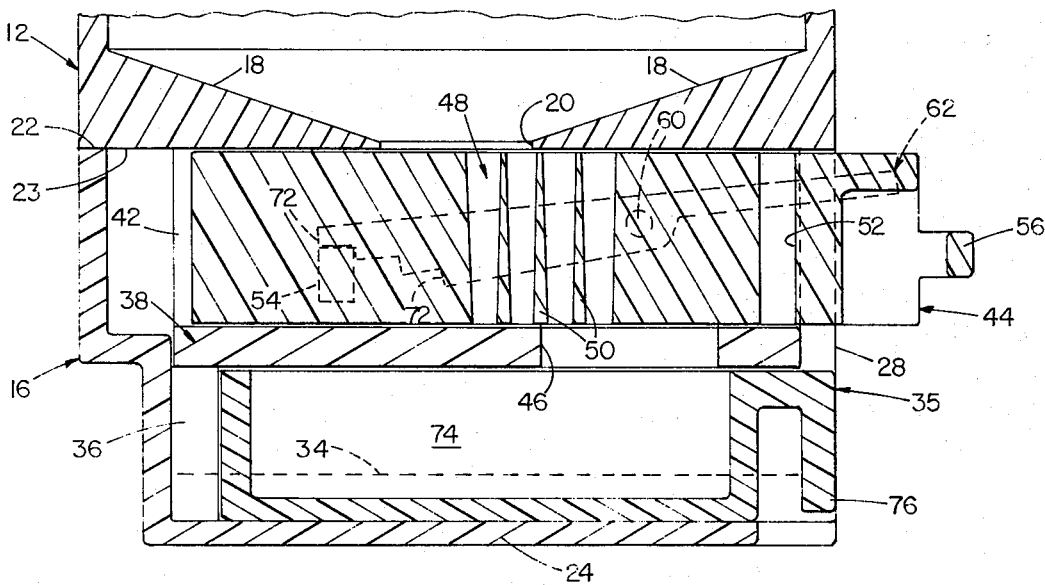
FIG. 5 is a view similar to FIG. 4 showing the device in a partial dispense operation.

Slide 44 has a flat top with a fill-dispense opening 48, open at top and bottom, and preferably, as shown, of generally rectangular shape, which is divided by partitions 50 into a plurality of separate compartments open at top and bottom, four as shown, the partitions being preferably slightly thicker at the bottom than at the top as shown in FIGS. 3 to 5. Forwardly of opening 48 is a slot 52 in slide 44, serving to remove into the receiving cup excess of the dispensed material which may escape onto the slide top, as hereinafter described. The sidewall of slide 44 facing wall 42 when the slide is in position on shelf 38 has a stop 54 projecting laterally therefrom which forms part of the control and adjustment mechanisms hereinafter described. A handle 56 is provided on the front face of slide 44.

An aperture 58 in wall 42 of shelf 38 rotatably receives a cylindrical stud 60 centrally disposed on a lever designated generally 62. Stud 60 has a screw threaded bore to receive the threaded shank of a clamp bolt 64 when projected into aperture 58 from the inside of wall 42. Lever 62 has a lateral extension 66 on its forward end which lies outside wall 28 of base 16 when the parts are assembled to serve as a finger piece or handle, and an adjacent shorter extension 68 which co-operates with notches 70 opposite the several lines of indicia 32 on wall 28. Stud 60 and bolt 64 are proportioned so that extension 68 is spring-biased by lever 62 toward and into notches 70. The inner end of lever 62 is bent inwardly and stepped forwardly at intervals from top to bottom to provide a rotary stop with stop lugs 72 at progressively shorter distances along the slide path of slide 44 from the front extension 66 of the lever.

Cup 35 slides on bottom 24 under shelf 38 and between walls 26 and 28. It has an interior cavity 74 which is larger than the capacity of all the compartments of dispensing opening 46 and underlies that opening at one end. The cup seats at its rear end against one of the ribs 36 and is provided on its front end with a tab handle 76.

FIGS. 3-5 illustrate fill-dispense operations of the device assembled as indicated in FIG. 2 and shown in FIG. 1. FIG. 3 illustrates the fill position of the device in which slide 44 is pushed to its rearmost position abutting the rear wall of base 16. In this position of the slide, fill-dispense opening 48 thereof is fully exposed at its top to container discharge outlet 20 and is fully closed at its bottom by shelf 38 which constitutes the closure member for the compartment bottoms of this embodiment. All compartments formed by partitions 50 in opening 48 are therefore filled with material to be dispensed from container 12. To dispense, slide 44 is pulled out until its stop 54 engages one of the stop lugs 72 on lever 62. In FIG. 4, lever 62 is positioned with its lowermost lug 72 in the path of stop 54 and since this lug is the furthest forward, the bottoms of all compartments are exposed to opening 46 in shelf 38 so that their contents discharge into cavity 74 of cup 35, their tops being closed by the overlying portion of the bottom 18 of the container which shields them from the container opening and constitutes the shield member for compartment tops of this embodiment.

In FIG. 5 lever 62 is shown positioned with its next to top lug 72 in the path of stop 54, so that member 44 is stopped with only the front two of the four compartments of opening 48 over opening 46, so that only these two compartments dispense. The other two compartments remain filled as their bottoms are closed by shelf 38, and they will stay filled until a lower lug 72 of lever 62 is moved into the path of stop 54 for a subsequent dispensing. With the top lug 72 in the path of stop 54 only the front compartment will dispense, while with the next to bottom lug in the path, the front three compartments will dispense.

Whereas only four compartments are shown in opening 48, five notches 70 are provided for five settings of lever 62. When the lever is positioned in engagement with the lowermost notch, all of its lugs 72 are raised out of the path of stop 54 so that dispensing slide member 44 may be withdrawn from the device, as may be occasionally desirable for cleaning purposes when container 12 is empty. If this feature is not used, the lugs 72 may be one less in number than the number of compartments, the dispensing member being otherwise stopped in full discharge position (all compartments) (e.g., by a separate fixed or retractable stop with the lugs 72 removed from the path of stop 54).

It will be noted that whenever slide 44 is moved to fill position its slot 52 is over opening 46. Thus, material from container 12 that works its way forward on the top of slide 44 will be discharged through slot 52 into the cup and undesirable dusting out of such material is prevented.

If it is desired to dispense more than the capacity of all compartments in opening 48, the slide can be returned to fill position after a first dispense, the lever 62 can be reset if necessary and the refilled slide moved again to dispense position, in which case cup 35 may need to be pulled out somewhat from its rearmost position to insure its acceptance of the greater amount.

All parts of the device can be readily and inexpensively molded from plastic and such construction is preferred, except possibly for lever 62 and its fastener 64 which may more desirably be made of metal. Slide 44 may be molded as a solid block except for the openings through it and defining the handle, as shown, or it may be hollow, with interior walls defining the opening 48.

Indicia 32 indicate the capacity that will be dispensed at each setting of the handle of lever 62 in a corresponding notch 70, the indicia for the lowermost setting indicating that it is for slide removal only. Assuming the aggregate capacity of all compartments to be one cup, the indicia for the first four settings from the top would be — ¼ cup — ½ cup — ¾ cup — 1 cup. The handle of lever 62 thus cooperates with the indicia to adjust and set as desired the control mechanism comprising the interengaging stops on lever and slide.

It is preferred to have the outlet 20 from the container at the rear of the dispense opening 46 as shown because the fill position is the normal position when the device is not in use, and in that position the front wall of slide 44 is flush with sidewalls 26, 28 as is desirable. While it has been indicated that container 12 is fastened to base 16 and shelf 38 is also fastened thereto, these parts may simply fit together and be separable, as would be desirable to facilitate complete cleaning.

The embodiment of FIGS. 6–9 has certain structural differences and advantages over the embodiment of FIGS. 1–5 which make it presently preferred to the latter embodiment.

Figure 6:
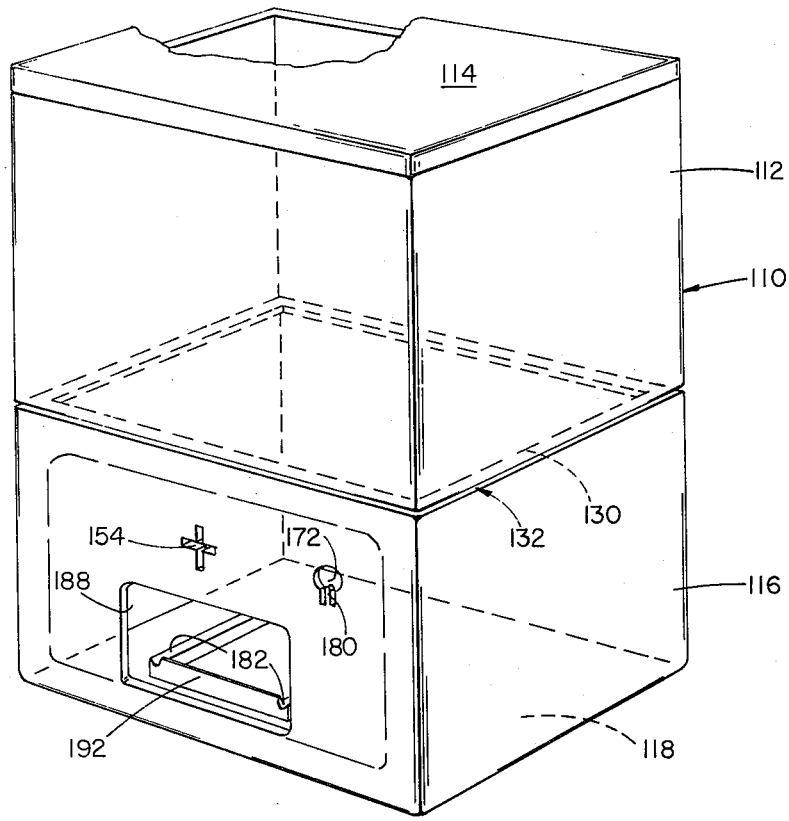
FIG. 6 is a view similar to FIG. 1 of the external housing of a modified device.
Figure 7:
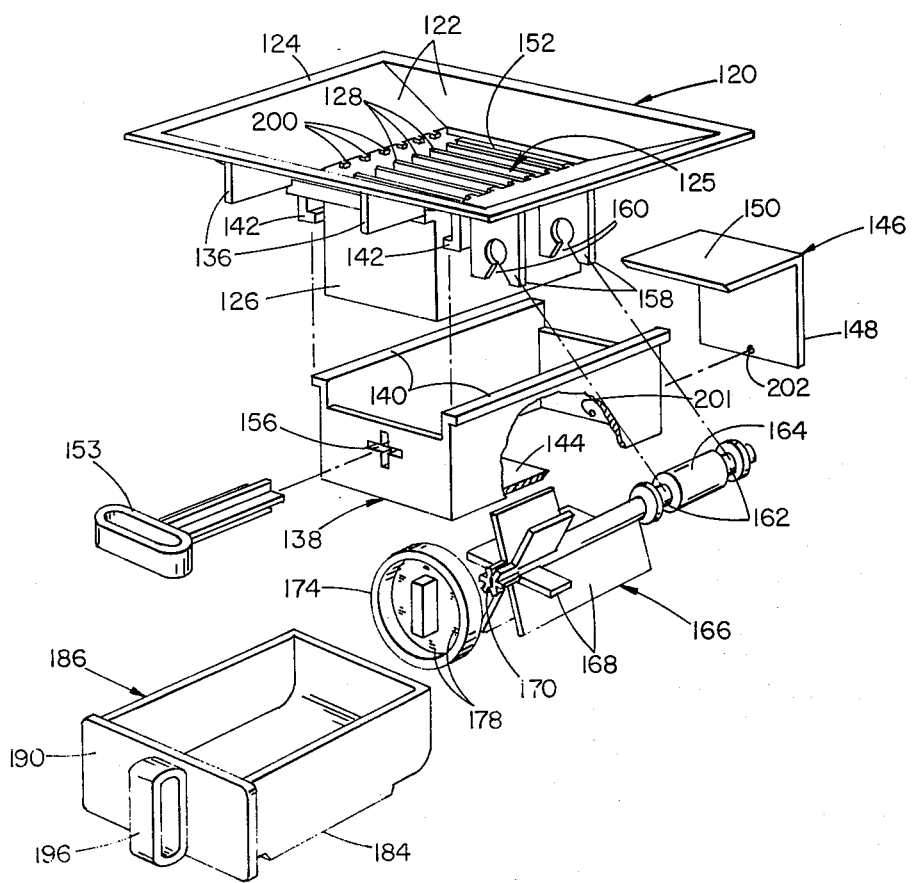
FIG. 7 is an exploded perspective view of parts that are assembled into the housing of FIG. 6.

Referring to FIGS. 6 and 7, the device has an external housing (FIG. 6) designated generally 110, which is shown as generally rectangular in cross-section and has the external sidewalls of its container portion 112 and the external sidewalls and bottom wall of its base portion 116 formed integral, preferably of plastic by a single molding operation. A removable top cover 114 is provided for the container portion, and the housing is provided with a flat base 118 for supporting the device on a counter or table, or means (not shown) may be provided for attaching the housing to a wall.

In this embodiment the container bottom, designated generally 120, is a separate piece, preferably also of molded plastic, which carries the dispensing, control and adjustment mechanisms. Bottom 120 has sidewalls 122 sloping inwardly from a marginal rim 124 at the top to adjacent the container outlet opening 125 centrally of the bottom. The container outlet opening is surrounded by an open-ended chute 126 of rectangular shape and divided into dispensing compartments (six shown) by partitions 128 like partitions 50 of the FIGS. 1–5 embodiment. The chute and partitions are formed integral with the bottom so that in this embodiment the dispensing compartments are fixed at the container outlet opening. Rim 124 is of a size to fit closely within the sidewalls of container portion 112 of housing 110 so that it may be seated for support on an inwardly projecting ledge 130 extending about the interior of the housing. As shown, ledge 130 is conveniently formed by indenting the walls of the housing inwardly at 132 (see FIGS. 8 and 9) and rim 122 may snapfit in place under lugs 134. Bottom 120 is shown as provided on its underside with reinforcing ribs 136.

A sliding frame 138 has side extension rails 140 which are slidably received in guides 142 formed on the underside of container bottom 120 at each side of outlet chute 126. The bottom of frame 138 is partially closed by a wall member 144 extending rearwardly from the front wall of the frame and having its end slightly beyond the mid portion of the frame. Wall member 144 forms the closure member for the compartment bottoms in this embodiment. A wall member 146 has a shank 148 for attachment to the rear wall of frame 138 and when assembled thereto has a top 150 which forms a partial closure for the top of the frame, extending from its rear wall forwardly and having its end located slightly forwardly of the end of member 144. Top 150 of member 146 forms the shield member of this embodiment for shielding the tops of the compartments from the outlet opening 125. When the device is assembled, top 150 extends through a slot 152 at the rear end of container outlet opening 125. Frame 138 is reciprocated by a handle 153 having a shank of cruciform cross section which, when the device is assembled, is slidable through a correspondingly shaped, slightly larger opening 154 in the front of housing 110 and is held to the frame by a slightly smaller opening 156 of corresponding shape in the resilient plastic front end wall of the frame, into which it is jammed and the sides of which securely grip it.

The underside of container bottom 120 is provided at one side of chute 126 with a pair of lugs 158 having keyhole slots 160 for receiving and rotatably retaining reduced portions 162 on the shaft 164 of a control member designated generally 166. Forwardly of portions 162 shaft 164 has projecting lugs 168 of different lengths and which, at different rotated positions of member 166, extend into the path of sliding movement of frame 138 to stop the forward sliding dispense movement thereof at different selected positions as hereinafter explained, the number of lugs 168 corresponding to the number of dispense compartments of chute 126. The forward end 170 of shaft 164 is ribbed, the ribs forming grooves between them equal in number to the number of lugs 168, end 170 being of a size to fit rotatably through an aperture 172 in the front of housing 110. An operating dial 174 for member 166 has a socket 176 (see FIGS. 8 and 9) shaped to grip the outer portion of end 170 which extends through aperture 172 so that member 166 may be rotated thereby. Dial 174 carries indicia indicated generally at 178 showing the compartment capacities that will be dispensed at each setting of member 166 by the dial. A resilient tongue 180 formed between two slots in the bottom of aperture 172 cooperates with the ribs and grooves of shaft end portion 170 within the aperture to releasably latch the dial in each of its adjusted positions.

The base 118 of the housing is provided with a pair of grooved rails 182 which slidably receive ribs 184 on the bottom of a cup 186. Cup 186 is insertable through opening 188 near the base of the housing with ribs 184 registering with and sliding in rails 182 until a front piece 190 thereof closes opening 188, in which position a transverse rib 192 on housing base 118 engages a transverse rib 194 on the bottom of the cup to stop the insertion (see FIGS. 8 and 9). The cup is provided with a handle 196. A small rib 198 on the bottom of the cup slightly to the rear of front piece 190 serves to retain the cup against removal except by a firm pull on the handle. As will be seen from FIGS. 8 and 9, cup 186 is positioned when fully inserted to receive the full capacity discharge from the dispensing compartments and is larger than required to retain that capacity, preferably more than twice as large.

In assembling the device, frame 138 is assembled to bottom 120 by pushing it up about chute 126 until its rails 140 spread guides 142 sufficiently to snap in place over them. (If the device were not made of resilient plastic permitting such assembly, one of the end walls of the frame could be fastened thereto after assembly, permitting the frame to slide into position endwise over the rails). Top 150 of member 146 is slid through opening 152 over the tops of partitions 128 and under a series of lugs 200 at the sides of opening 125 which serve to keep it from lifting. When its top 150 is fully inserted, shank 148 of member 146 is fastened to the rear end wall of frame 138, for example, by a screw passing through the matching holes indicated at 201 and 202 in FIG. 7, or otherwise. Member 166 is loosely assembled to housing 110 by inserting its end 170 through opening 172 and resting its other end temporarily on base 118.

Container bottom 120 is now inserted into the open end of housing 110 into position on shelf 130 under lugs 134 which yield to permit it to snap in place. By reaching through cup opening 188 in the housing, shaft 164 of member 166 is manipulated to position reduced portions 162 thereof in the rounded ends of keyhole slots 160. The shank of handle 153 is inserted through opening 154 in the housing and the end thereof is forced to wedge into gripping relation with the sides of opening 156 in the front of frame 138. Dial 174 is applied to the end portion 170 of shaft 164 protruding through opening 172 in the housing, cup 186 is inserted through opening 188 in the housing until it closes it, and cover 114 is applied to complete the assembly.

While it has been found that member 166 may be readily assembled to the device in the manner described, it can be modified for assembly to bottom 120 before it is inserted in the housing. Thus its shaft 164 may be shortened sufficiently to pass ledge 130 by eliminating end 170 and providing similar structure on a central boss of dial 174 which is inserted through aperture 172 and wedged onto the end of the assembled shaft.

Figure 8:
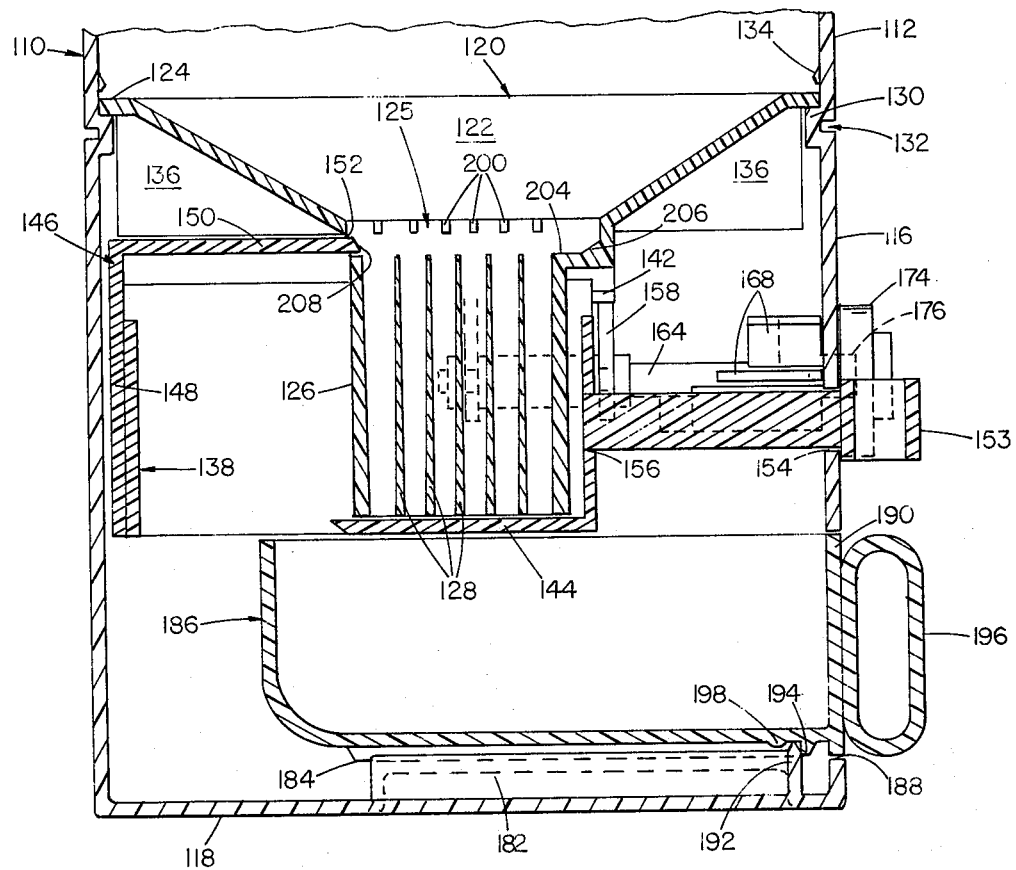
FIG. 8 is a view similar to FIG. 3 of the assembled device of FIGS. 6 and 7.

FIG. 8 illustrates the fill position of this embodiment in which handle 153 is pushed in as far as it will go to slide frame 138 to its rearmost position. In this position, shield member 150 is fully retracted through slot 152 so that the tops of all compartments are exposed to container outlet opening 125, while member 144 has slid under the bottoms of all compartment partitions 128 and under the front and back walls of chute 126 so that the bottoms of all compartments are closed by it. Therefore all compartments are filled with material to be dispensed.

Figure 9:
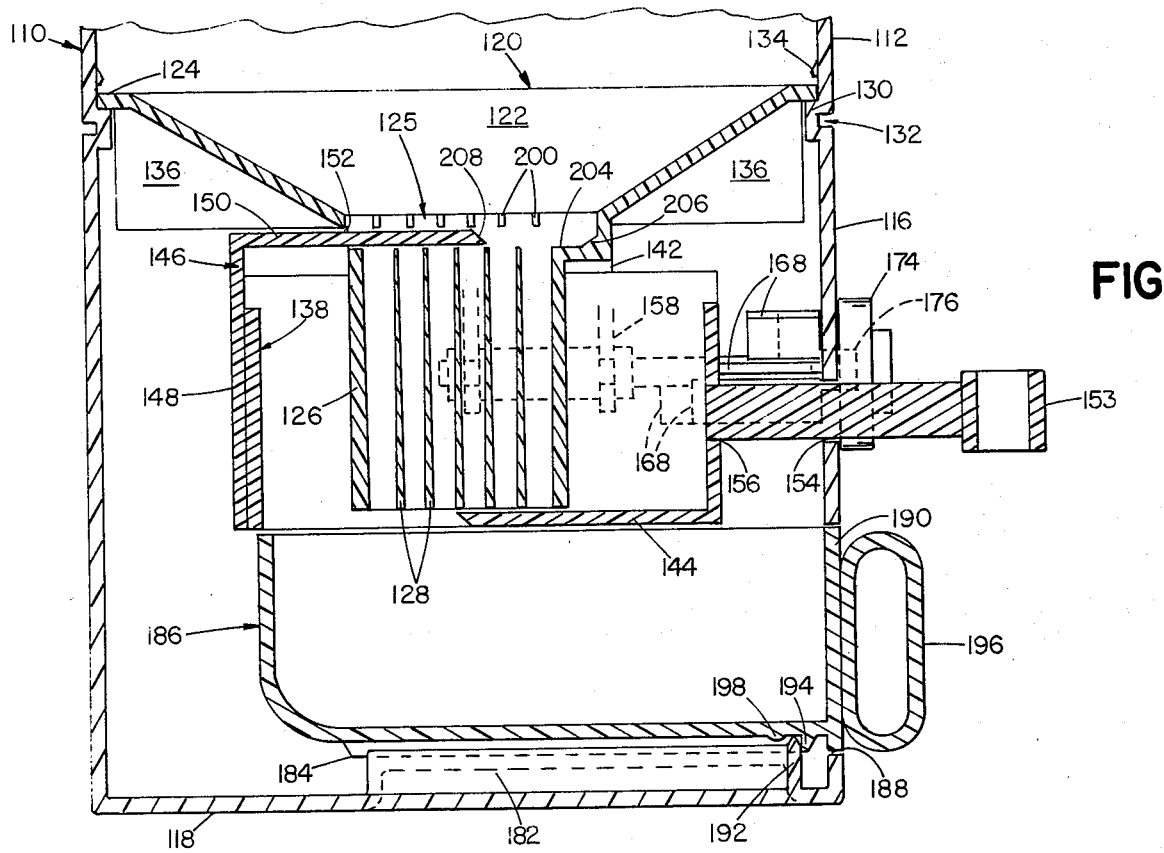
FIG. 9 is a view similar to FIG. 5 of the assembled device of FIGS. 6 and 7.

FIG. 9 shows a dispense operation with dial 174 set to position in the path of frame 138 the one of the lugs 168 which corresponds to a dispensing of the contents of three of the dispense compartments. As handle 153 is pulled out, member 150 is slid over the top of each compartment starting with the rearmost. Due to their overlapped arrangement, member 144 is not slid out from under a compartment until member 150 has covered it. When the selected lug 168 stops retraction of handle 153 and frame 138, member 150 is in position shielding the tops of four compartments from the container outlet while member 144 has uncovered the bottoms of only the selected three rearmost compartments and these therefore dispense into cup 186. The user now returns the handle 153 to the fill position of FIG. 8, removes cup 186 for emptying and reinserts the cup so that the device is ready for another dispense operation. As handle 153 is pushed back in, member 144 slides under to close each dispensed compartment before member 150 is withdrawn to expose its top. Thus outlet opening 125 is never exposed through chute 126 regardless of the position of handle 153.

It will be appreciated that any desired number of the compartments from one to all six may be dispensed as just described by appropriate setting of dial 174. When all compartments are dispensed, member 150 slides the width of one compartment beyond the frontmost one on a small flat area 204 on the container bottom at the front end of the chute. The outer end of this flat portion is provided with an upwardly and outwardly slanting area 206 which cooperates with a beveled front edge 208 on member 150 to prevent overlying material in the container portion from jamming between the front edge of member 150 and the container bottom.

When cup 186 is pulled out, rib 192 passing under rib 198 jostles the cup with the desirable effect of tending to level off the contents of the cup. Additionally, rib 192 functions to scrape the bottom of the cup as it is withdrawn and thus prevent any material escaping to bottom 118 of the housing from accumulating on the cup bottom and so escaping to the exterior. It will be noted that when handle 153 is drawn out to a dispense position, it interferes with ready access to cup handle 196. This arrangement is deliberate, so that the user will more or less automatically push handle 153 back to fill position before removing the cup. This will insure that the device will be ready for the next dispense operation without the user having to wait for fill to take place.

The embodiment just described is preferred to that of FIGS. 1–5 for several reasons. It is easy to mold entirely of plastic, considered a desirable material of construction, and it is also easy to assemble. There is less opportunity for the dispensed material to leak or dust out of the device, both because the housing is of one piece construction and because slide member 44 of the other embodiment, moving in and out of base 16, can produce considerably more leakage than handle 153. Frame 138 is lighter and easier to operate than slide member 44, particularly because it has no load of material to be dispensed. While it could be disassembled for cleaning by reversing the assembly operation, there should be no need for this, since with the cup and cover removed and the container portion empty the device can be washed simply by running water through it.

I claim:

1. A device for measuring and dispensing granular material which comprises:

a container for the material having a material discharge outlet opening at the bottom thereof;

dispensing means including a plurality of closely adjacent material receiving compartments open at top and bottom, a barrier member for shielding the tops of said compartments from said outlet opening at one position relative to said compartments, and a closure member for closing the bottoms of said compartments at one position relative to said compartments;

means mounting said compartments and said members beneath said container for relative reciprocation between a single fill position in which all of said compartments are exposed at their tops to said outlet opening and are closed at their bottoms by said bottom closure member, and a plurality of dispense positions in which selected different numbers of said compartments have the tops thereof shielded from said outlet opening by said barrier member and the bottoms thereof exposed for dispensing;

dispense operating means accessible from the exterior of the device for relatively reciprocating said compartments and said members;

control means adjustable to stop the relative movement of said compartments and said members by said dispense operating means at selected dispense positions corresponding to said selected numbers, said control means being rotatable about an axis at one side of the path of relative movement of said compartment and said members and carrying lugs respectively adapted to engage a part movable by said dispense operating means at said respective dispense positions;

and adjustment means for said control means accessible from the exterior of the device and operable to set said control means to stop said relative movement at said selected positions, including indicator means showing the compartment capacity to be dispensed at each setting of said adjustment means.

2. A device for measuring and dispensing granular material which comprises:

a container for the material having a material discharge outlet opening at the bottom thereof;

dispensing means including a plurality of closely adjacent material receiving compartments open at top and bottom, a barrier member for shielding the tops of said compartments from said outlet opening at one position relative to said compartments, and a closure member for closing the bottoms of said compartments at one position relative to said compartments;

means fixedly mounting said compartments at said outlet opening and mounting said members for reciprocation across the tops and bottoms respectively of said compartments between a single fill position in which all of said compartments are exposed at their tops to said outlet opening and are closed at their bottoms by said bottom closure member, and a plurality of dispense positions in which selected different numbers of said compartments have the tops thereof shielded from said outlet opening by said barrier member and the bottoms thereof exposed for dispensing;

dispense operating means accessible from the exterior of the device for reciprocating said members;

control means adjustable to stop the movement of said members by said dispense operating means at selected dispense positions corresponding to said selected numbers;

and adjustment means for said control means accessible from the exterior of the device and operable to set said control means to stop said movement at said selected positions, including indicator means showing the compartment capacity to be dispensed at each setting of said adjustment means.

3. A device according to claim 2 wherein said members are connected to said dispense operating means for reciprocation thereby oppositely in unison and so that said closure member is positioned to close the bottom of each compartment before said barrier member is positioned to open the top thereof to said outlet opening.

4. A device according to claim 3 wherein said barrier member is a plate movable across said outlet opening over said compartments, and the bottom of said container is provided with a recess for receiving the end of said plate when in full compartment-shielding position, said recess having its outer end sloping outwardly and upwardly.

5. A device according to claim 4 wherein the end of said plate received in said recess is beveled.

6. A device according to claim 2 which includes an enclosure for said dispensing means having an opening therein for receiving a cup, and a cup insertable through said opening to a position for receiving the material dispensed by said compartments, said cup having a member closing said opening when said cup is in said position.

7. A device according to claim 6 wherein said cup has a capacity substantially in excess of the total capacity of said compartments.

8. A device according to claim 6 wherein said enclosure is integral with the sidewalls of said container, said container has a bottom separate from the sidewalls thereof and insertable between said sidewalls, said bottom including said outlet opening, and ledge means is provided on the interior of said sidewalls for supporting said bottom.

9. A device according to claim 8 wherein said bottom carries said compartments, said members and said mounting means.

10. A device according to claim 9 wherein said bottom also carries said control means.

11. A device according to claim 2 wherein said compartments are convergent toward their outlet ends.

* * * * *